United States Patent
Davies et al.

(10) Patent No.: US 9,611,412 B2
(45) Date of Patent: Apr. 4, 2017

(54) PROCESS FOR COATING DIAMOND WITH REFRACTORY METAL CARBIDE AND METAL

(75) Inventors: Geoffrey John Davies, Springs (ZA); Johannes Lodewikus Myburgh, Springs (ZA)

(73) Assignee: Element Six (Production) (PTY) LTD (ZA)

( * ) Notice: Subject to any disclaimer, the term of this patent is extended or adjusted under 35 U.S.C. 154(b) by 0 days.

(21) Appl. No.: 13/201,191

(22) PCT Filed: Feb. 11, 2010

(86) PCT No.: PCT/IB2010/050623
§ 371 (c)(1),
(2), (4) Date: Nov. 1, 2011

(87) PCT Pub. No.: WO2010/092537
PCT Pub. Date: Aug. 19, 2010

(65) Prior Publication Data
US 2012/0040188 A1   Feb. 16, 2012

(30) Foreign Application Priority Data

Feb. 11, 2009  (GB) .................................. 0902232.8

(51) Int. Cl.
*B32B 9/00* (2006.01)
*C09K 3/14* (2006.01)
(Continued)

(52) U.S. Cl.
CPC ............ *C09K 3/1436* (2013.01); *B22F 1/025* (2013.01); *C04B 35/62818* (2013.01);
(Continued)

(58) Field of Classification Search
None
See application file for complete search history.

(56) References Cited

U.S. PATENT DOCUMENTS 4,063,907 A * 12/1977 Lee et al. .......................... 51/295
5,011,514 A *  4/1991 Cho et al. ......................... 51/295
(Continued)

FOREIGN PATENT DOCUMENTS

AT     411739 B   10/2003
EP    0459461 B    8/1995
(Continued)

OTHER PUBLICATIONS

The Oxford English Dictionary definition of "further".*
PCT Search Report for PCT/IB2010/050623 dated Apr. 21, 2010.

*Primary Examiner* — Humera Sheikh
*Assistant Examiner* — Seth Dumbris
(74) *Attorney, Agent, or Firm* — Bryan Cave LLP

(57) ABSTRACT

The invention relates to method of depositing refractory metal carbide onto part of a surface of a body comprising diamond, the method including adhering directly onto part of the surface a refractory precursor material comprising a compound including oxygen and at least one metal selected from the group consisting of Ti, V, Cr, Zr, Nb, Mo, Hf, Ta and W; the refractory precursor material being reducible in the presence of carbon on the application of heat to form at least one compound comprising metal carbide or mixed metal carbide; and reducing the refractory precursor material by the application of heat. The invention further relates to a body comprising diamond, part of the surface of the body having directly adhered thereto a metal carbide and part of the surface of the body having directly adhered thereto a metallic material and the content of diamond being greater than 80 volume percent of a volume of the body.

7 Claims, 2 Drawing Sheets

(51) Int. Cl.
  *B22F 1/02* (2006.01)
  *C04B 35/628* (2006.01)
  *C23C 18/12* (2006.01)
(52) U.S. Cl.
  CPC .. *C04B 35/62821* (2013.01); *C04B 35/62831* (2013.01); *C04B 35/62886* (2013.01); *C04B 35/62892* (2013.01); *C23C 18/1204* (2013.01); *C23C 18/1245* (2013.01); *C23C 18/1254* (2013.01); *B22F 2998/00* (2013.01); *B22F 2999/00* (2013.01); *C04B 2235/427* (2013.01); *C04B 2235/441* (2013.01); *C04B 2235/5436* (2013.01); *Y10T 428/2993* (2015.01)

(56) References Cited

U.S. PATENT DOCUMENTS

| | | | | |
|---|---|---|---|---|
| 5,173,091 | A * | 12/1992 | Marek | 451/527 |
| 5,211,726 | A * | 5/1993 | Slutz et al. | 51/293 |
| 5,304,342 | A * | 4/1994 | Hall et al. | 419/11 |
| 6,454,027 | B1 * | 9/2002 | Fang | C09K 3/1418 |
| | | | | 175/374 |
| 7,435,276 | B2 * | 10/2008 | Chen | B23D 61/18 |
| | | | | 428/403 |
| 2002/0014041 | A1 | 2/2002 | Baldoni et al. | |
| 2003/0106270 | A1 | 6/2003 | Baldoni et al. | |
| 2003/0134135 | A1 * | 7/2003 | Noda | B22F 5/12 |
| | | | | 428/469 |
| 2006/0182883 | A1 * | 8/2006 | Neogi | C04B 41/009 |
| | | | | 427/240 |
| 2009/0090563 | A1 * | 4/2009 | Voronin et al. | 175/434 |

FOREIGN PATENT DOCUMENTS

| | | |
|---|---|---|
| JP | 60149774 A2 | 8/1985 |
| JP | 61041761 A1 | 2/1986 |
| JP | 10053823 A | 2/1998 |
| JP | 10140204 A | 5/1998 |
| JP | 10280158 A | 10/1998 |
| WO | 9105025 A1 | 4/1991 |
| WO | PCT/US90/06335 | 5/1991 |
| WO | 2005017227 A1 | 2/2005 |
| WO | 2005078045 A1 | 8/2005 |
| WO | 2006032982 A1 | 3/2006 |
| WO | 2007088461 A1 | 8/2007 |
| WO | WO2009150626 * | 12/2009 |

* cited by examiner

PROCESS FOR COATING DIAMOND WITH REFRACTORY METAL CARBIDE AND METAL

FIELD

This invention relates to a method of depositing a refractory metal carbide onto a body comprising diamond, particularly but not exclusively onto diamond grains, and to diamond bodies having refractory material adhered thereto.

BACKGROUND

Superhard materials such as diamond are used in a wide variety of forms to machine, bore and degrade hard or abrasive work-piece materials. These materials may be provided as single crystals or polycrystalline structures comprising a directly sintered mass of grains of diamond forming a skeletal structure, which may define a network of interstices between the diamond grains. The interstices may contain a filler material, which may comprise a sintering aid for the diamond and possibly also a hard phase such as an inter-metallic or ceramic material. The filler material may be fully or partially removed in order to alter certain properties of the diamond structure material.

Various methods are known in the art for coating grains, particularly diamond grains with ceramic or metallic phases. For example, chemical vapour deposition (CVD), physical vapour deposition (PVD), sputter coating, fluidised bed methods and various methods involving the suspension of the grains in a liquid are well known. The last-mentioned approach includes electrolytic deposition, chemical electroless deposition, molten salt methods, and sol gel methods, which are taught in PCT publication numbers WO 2007/088461 and WO 2006/032982. CVD and PVD methods for coating abrasive grains, particularly diamond, are taught, for example in PCT publication numbers WO 2005/017227 and WO 2005/078045.

PCT publication number WO 2006/032982 discloses a method for coating abrasive grains, particularly cBN and diamond grains, with oxide, carbide, nitride, oxy-nitride, oxy-carbide or carbo-nitride material, as well as metals such as molybdenum and tungsten in elemental form.

There is a need for an efficient method for providing bodies comprising diamond having enhanced resistance to thermal degradation, and for such bodies, particularly but not exclusively for use as raw material for the manufacture of polycrystalline diamond material or a tool.

SUMMARY

As used herein, a refractory material is a material having properties that do not vary significantly with temperature up to at least about 1,100 degrees centigrade, or at least are not substantially degraded on heating to at least this temperature. Non-limiting examples of refractory metals are Ti, V, Cr, Zr, Nb, Mo, Hf, Ta and W. Non-limiting examples of refractory ceramic materials are carbides, oxides, nitrides, borides, carbo-nitrides, boro-nitrides of a refractory metal or of certain other elements.

As used herein, a refractory precursor material is a material that is capable of yielding a refractory metal or a refractory ceramic material responsive to a treatment, such as the application of heat.

As used herein, a mixed metal carbide is a material according to the formula $M_xM'_yC_z$, where M and M' are selected from the group consisting of IVB, VB and VIB or the Periodic Table subject to the condition that M and M' are not the same element, x and y are numbers the sum of which is in the range from 0.5 to 1.5, and preferably the sum of which is 1, and z is a number, and preferably z is in the range from 0.5 to 1.5, and z is preferably 1.

As used herein, a refractory metal carbide is a carbide compound of a refractory metal.

A first aspect to the invention provides a method of depositing a refractory metal carbide onto part of a surface of a body comprising diamond, the method including adhering directly onto a part of the surface a refractory precursor material comprising a compound including oxygen and at least one metal selected from the group consisting of Ti, V, Cr, Zr, Nb, Mo, Hf, Ta and W; the refractory precursor material being reducible in the presence of carbon on the application of heat to form at least one compound comprising metal carbide or mixed metal carbide; and reducing the refractory precursor material by the application of heat.

In one embodiment, the refractory precursor material is in the form of microstructures.

The term microstructure is intended to encompass grains, particles or other particulate formations of refractory material.

The refractory microstructures may be disposed on the surface of the body as formations having various forms having various shapes. For example, the microstructures may be granular, reticulated, vermiform or laminar in form, or have other forms or shapes or a combination of forms or shapes.

As used herein, solvent/catalyst material for diamond is a material capable of promoting the growth of diamond and the formation of direct diamond-to-diamond bonds at a temperature and pressure at which diamond is thermodynamically stable. Examples of solvent/catalyst materials for diamond are Fe, Ni, Co and Mn, and certain alloys including any of these.

As used herein, a solvent/catalyst precursor material is a material that is capable of yielding a solvent/catalyst material for diamond responsive to a treatment, such as the application of heat.

In an embodiment of the invention, the method includes adhering directly onto another part of the surface a solvent/catalyst precursor material comprising a compound including oxygen and at least one metal selected from group consisting of Fe, Co, Ni and Mn, the solvent/catalyst precursor material being reducible in the presence of carbon on the application of heat to form a metallic material; and reducing the solvent/catalyst precursor material by the application of heat.

In one embodiment the metal carbide and/or metallic material is bonded directly to the surface of the body.

In some embodiments, the body comprises diamond as an individual grain or as a bonded mass comprising diamond. In one embodiment, the body is in particulate form, and in one embodiment, the body has a size of at least about 0.05 microns and at most about 10 microns.

In one embodiment, the refractory precursor material and the solvent/catalyst precursor materials are deposited in consecutive steps. In one embodiment, the refractory precursor material is adhered before the solvent/catalyst precursor material is adhered. In another embodiment, the solvent/catalyst precursor material is adhered before the refractory precursor material is adhered. In another embodiment, the refractory precursor material and the solvent/catalyst precursor materials are adhered substantially simultaneously.

An alkoxide is understood to have the general formula M(OR)n, where M is a metal of valency n and R is a hydrocarbon chemical species.

In some embodiments, refractory precursor material comprises a compound containing Ti, Ta, Zr or Nb, or a combination of these. In some embodiments, the refractory precursor material comprises an oxide or salt compound. In some embodiments, the metal oxide or salt compound, or both, are deposited and adhered from a water or alcohol suspension. In some embodiments, the method includes introducing an alkoxide solution of Ti, V, Cr, Zr, Nb, Mo, Hf, Ta or W metal in alcohol into the stirred suspension with a separate aliquot of water in alcohol. In some embodiments, the method includes introducing an alkoxide selected from tantalum ethoxide, $Ta(OC_2H_5)_5$, titanium iso-propoxide, $Ti(OC_3H_7)_4$, zirconium n-propoxide, $Zr(OC_2H_7)_4$ and niobium ethoxide, $Nb(OC_2H_5)_4$.

In some embodiments, a sol-gel or a precipitative method, or a combination of these methods is used to deposit/adhere at least one of the refractory material or the solvent/catalyst precursor material.

In some embodiments, the solvent/catalyst precursor material comprises a compound containing Ni or Co, or an alloy including these.

In some embodiments, the method includes reducing the solvent/catalyst precursor material in a hydrogen atmosphere to yield a metallic material comprising Co, Ni or Fe in elemental or metal alloy form.

Embodiments of the invention have the advantage that non-diamond carbon is generated near the diamond surface, which may have the advantage of promoting carbo-thermal reduction of the coating, and in particular the carbo-thermal reduction of elements of the coating that are not readily reduced by hydrogen.

Embodiments of the method of the invention have the advantage that a coating comprising both ceramic and metallic materials, or cermet materials may be formed onto a body comprising carbon efficiently and at lower temperatures than known methods, and without the need for a flowing carbonaceous gas to be present.

A second aspect of the invention provides a body comprising diamond, a part of the surface having adhered thereto a refractory precursor material comprising a compound including oxygen and at least one metal selected from the group consisting of Ti, V, Cr, Zr, Nb, Mo, Hf, Ta and W; the refractory precursor material being reducible in the presence of carbon on the application of heat to form at least one compound comprising metal carbide or mixed metal carbide; and part of the surface of the body having adhered thereto a solvent/catalyst precursor material comprising a compound including oxygen and at least one metal selected from group consisting of Fe, Co, Ni and Mn, the solvent/catalyst material being reducible in the presence of carbon on the application of heat to form a metallic material.

In one embodiment the refractory precursor material is in the form of microstructures. The microstructures may have a mean size of at least 0.01 microns and at most 10 microns. The microstructures may comprise titanium carbide.

In one embodiment, the body according to this aspect of the invention is suitable for use in a method according to a first aspect of the invention.

A third aspect of the invention provides a body comprising diamond, part of the surface of the body having adhered directly thereto a metal carbide and part of the surface of the body having adhered directly thereto a metallic material and the content of diamond being greater than 80 volume percent of a volume of the body.

In one embodiment the metal carbide and/or the metallic material are bonded directly to the surface.

In one embodiment, the metal carbide covers at least about 50 percent of the surface area of the body. In some embodiments, the metal carbide covers at most about 95 percent of the surface area of the body, or at most 80 percent of the surface area of the body. In one embodiment, the carbide material does not occlude or cover the entire surface of the body, and a partial coating of the metal carbide exhibits discontinuities or gaps where portions of the surfaces of the body are not covered by the carbide, so that the metal carbide coating does not completely cover the surface of the body.

In one embodiment the refractory material comprises at least 5 volume percent of the body.

In one embodiment the metallic material comprises less than 10 volume percent of the body. The metallic material may comprise nickel.

In some embodiments, the metal carbide material is disposed, deposited or adhered on the surface of the body as structures, for example microstructures having various forms or shapes, such as granular, reticulated, vermiform or laminar structure, or has other structure or a combination of structures.

In one embodiment, the size scale of the metal carbide material microstructures is less than about 0.5 microns. In one embodiment, and the metal carbide microstructures have a mean thickness as measured from the body surface to which they are bonded, of less than about 500 nanometers.

In some embodiments, the metallic material has a mean thickness of less than about 1 micron, or less than about 500 nanometers. In some embodiments, the metallic material which may be in the form of a partial coating comprises distinct and substantially non-contiguous (discrete) "islands" or pockets, interspersed or intercalated with the formations of metal carbide material.

In one embodiment, the metallic coating comprises surfaces covered by a film of non-diamond carbon. Preferably the film has an average thickness of less than 100 nanometers and more preferable less than 20 nanometers.

Embodiments of diamond bodies according to an aspect of the invention have the advantage that they have enhanced resistance to thermal degradation and embodiments may be sintered together to make polycrystalline diamond material having enhanced thermal stability.

DRAWINGS

Non-limiting embodiments of the invention will now be described by way of example with reference to the drawings of which FIG. 1 shows a schematic representation of a cross-section of an embodiment of a grain with a partial coating of a carbide and metal.

Figure 1:
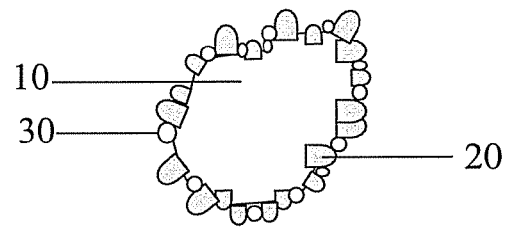

The same references refer to the same features in all drawings.

DETAILED DESCRIPTION OF EMBODIMENTS

An embodiment of the method of depositing a refractory precursor material onto a plurality of diamond grains, the method including suspending a plurality of diamond grains in the form of a powder in alcohol and maintaining the diamond grains in suspension by vigorous stirring; and simultaneously introducing into the stirred suspension a solution of alkoxide of at least one metal selected from Ti, V, Cr, Zr, Nb, Mo, Hf, Ta and W in alcohol. In one embodiment, a separate aliquot of water in alcohol is also introduced into the suspension.

Metal alkoxides react with the water in accordance with the well known sol-gel reactions to form amorphous oxide compositions as given in the generally in reaction (1).

$$M(OR)n+n/2H_2O = MOn/2+nROH \quad (1)$$

In this way the diamond grains become partially coated or "decorated" with the first precursor material, an amorphous, micro-porous oxide of the corresponding metal of the alkoxide in that the precursor material is adhered to parts of the surface of the diamond.

An embodiment of the method of depositing a solvent/catalyst precursor material onto a plurality of diamond grains, which in one embodiment may be partially coated or decorated with refractory precursor material, the method including suspending the plurality of diamond grains in water and vigorously stirring the suspension; and simultaneously introducing a solution of soluble salt(s) of Co, Ni or Fe into the stirred suspension together with a separate aqueous solution of a soluble salt reactant, resulting in an insoluble salt precursor for the carbide of the metal being precipitated, thereby partially coating, decorating or combining with the pre-existing metal oxide coat on each diamond particle. Nitrates of metals of group 8, 9 and 10 of the Periodic Table (IUPAC standard table), and particularly of period 4, namely Co, Fe and Ni, are examples of suitable soluble salts. Examples of preferred reactant solutions are alkali metals or ammonium carbonates, hydroxides, tungstates, molybdates and water soluble salts of general formula AMOx, where A indicates alkali metal or ammonium ions and M indicates a metal of groups 4, 5 and 6 of the Periodic table (IUPAC standard table), i.e. the elements Ti, V, Cr, Zr, Nb, Mo, Hf, Ta and W. Examples of reactant salts of general formula AMOx are sodium tungstate, Na2WO4 and sodium molybdate, Na$_2$MoO$_4$, which form precipitated CoWO$_4$ and CoMoO$_4$ respectively after reaction with cobalt nitrate, Co(NO$_3$)$_2$.

Equation (2) below is an example of a reaction for Co or Ni nitrates and sodium carbonate reactant solution to form Co and/or Ni carbonate as the precipitated precursor compound combining with the oxide precursor already formed.

$$(Co\ or\ Ni)(NO_3)_2 + Na_2CO_3 \rightarrow (Co\ or\ Ni)CO_3 + 2NaNO_3 \quad (2)$$

Partially coated diamond particles are recovered from the suspension by repeated settling, decantation or siphoning, washing and drying. The coating on the diamond particles comprises a combination of first precursor material, for metal carbide, and second precursor material, for a metallic material.

In one embodiment, the coated powders are heated in a furnace, and in some embodiments the coated powders are heated in a flowing gas comprising a mixture of hydrogen, argon or nitrogen, to pyrolyse and/or reduce the refractory precursor material to produce metal carbide ceramic structure disposed on the surfaces of the diamond particles.

In some embodiments, the salt-based solvent/catalyst precursor materials for Fe, Co or Ni are pyrolysed at low temperatures to form intermediate oxides, which may be reduced to the respective pure metal at similar low temperatures in a hydrogen atmosphere.

In one embodiment, the step of heat treatment is carried out in the presence of a flowing non-oxidising atmosphere, and in some embodiments, the flowing atmosphere comprises hydrogen and argon or hydrogen and nitrogen.

Examples of pyrolysis reactions involving cobalt or nickel carbonates are as follows:

$$(Ni)CO_3 \rightarrow (Ni)O + CO_2 \quad (3)$$

$$(Ni)O + H_2 \rightarrow Ni + H_2O \quad (4)$$

An exemplary reaction for the carbo-thermal reduction and formation of one of the preferred carbide components of the ceramic, namely tantalum carbide, TaC is given in equation (5).

$$2Ta_2O_5 + 9C \rightarrow 4TaC + 5CO_2 \quad (5)$$

This reaction is suitable for obtaining some of the preferred cermets, such as TaC/Co or TaC/Ni.

In one embodiment, TaC is deposited onto the diamond grains by depositing a refractory precursor material comprising tantalum oxide, Ta$_2$O$_5$, onto the grains surface at a temperature of about 1,375 degrees centigrade.

Some precursor materials for certain carbides may readily be reduced by hydrogen. For example, tungstic oxide, WO$_3$, is a suitable precursor for producing tungsten carbide, WC, and molybdic oxide, MoO$_3$, is a suitable precursor to form molybdenum carbide, Mo$_2$C.

In some embodiments, the elemental solvent/catalyst metal arising from the pyrolysis and/or reduction of the solvent/catalyst precursor material or materials is disposed/deposited/adhered on the diamond surface in the form of scaled dome-shaped particles (microstructures) with a mean size in the nanometer range. Where a sufficiently high temperature is used, the solvent/catalyst metal particles may react with the diamond surface and take carbon form the diamond into solid solution. The carbon may readily diffuse through the metal and may be capable of forming non-diamond, amorphous carbon layers on the surfaces of the metal particles. It may be possible to control this process by modifying the temperature time versus time profile of the furnace on the basis of trial and error assisted by inspection of the relevant phase diagrams, as would be appreciated by the person of ordinary skill. In the case of cobalt and nickel, the temperature at which the carbon solution, diffusion through the metal particles and precipitation of amorphous carbon begins above about 550 degrees centigrade and temperatures up to about 1,320 degrees centigrade can be used to control the degree of non-diamond carbon formation.

It is well known in the art that amorphous carbon can be very reactive in regard to carbo-thermal reduction reactions. The non-diamond carbon produced is in very intimate contact with the solvent/catalyst precursor compounds of the co-coating or decorating the diamond surfaces. These solvent/catalyst precursor compounds, which may be metal oxide, may not be readily reducible by hydrogen at low temperatures but have thermodynamically low onset temperatures for carbo-thermal reduction. These reactions can be kinetically facilitated by the very intimate contact with the very reactive none-diamond, amorphous carbon. This is a special feature of embodiments of the method. The carbo-thermal reduction of metal precursors materials in this way may provides for the low temperature formation of the corresponding metal carbides. The average grain size of such metal carbide, solvent/catalyst metal combinations disposed on the diamond particle surfaces may be of the order of nanometers.

As used herein, cermets are materials comprising metal carbide grains cemented or bonded together by means of a metallic binder, such as Co, Fe, Ni and Cr or any combination or alloy of these, the ceramic and metallic components accounting for respective volume percentages in the ranges from 55 percent to 95 percent, and 45 percent to 5 percent. Non-limiting examples of cermets include Co-cemented WC and Ni-cemented TiC.

The plurality of diamond particles produced by embodiments of the method of the invention may comprise diamond particles, the surfaces of which are "decorated" with fine, typically nanometer scale particulates (microstructures) comprising a ceramic and a metallic material, or a cermet material, and with highly reactive amorphous carbon disposed on the outer surfaces of the particulates.

With reference to FIG. 1, an embodiment of a partially and discontinuously coated diamond grain 10 has a partial coat in the form of substantially discontinuous refractory microstructures 20 comprising a refractory material. The refractory microstructures are in the form of "islands" or "patches" of material bonded to the surface of the diamond grain 10. The diamond grain 10 has a further coating 30 comprising a solvent/catalyst metallic material, the further coating being discontinuous and substantially intercalated or interspersed among the microstructures 20 of refractory material.

Figure 2:
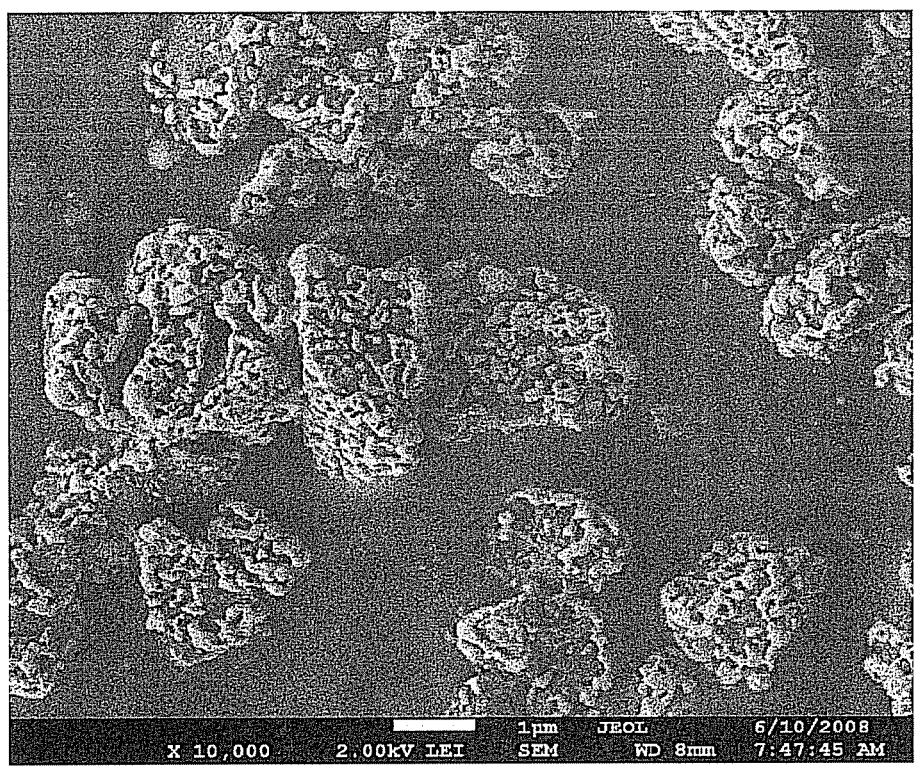
FIG. 2 shows a scanning electron micrograph (SEM) of an embodiment of partially coated diamond grains according to the invention.

With reference to FIG. 2, embodiments of diamond grains are coated with formations of TaC and Ni, the diamond grains having average size of about 2 microns and the TaC and Ni formations having sizes of the order of nano-meters. The grain size of the TaC is estimated to be about 40 to 60 nm in size.

Figure 3:
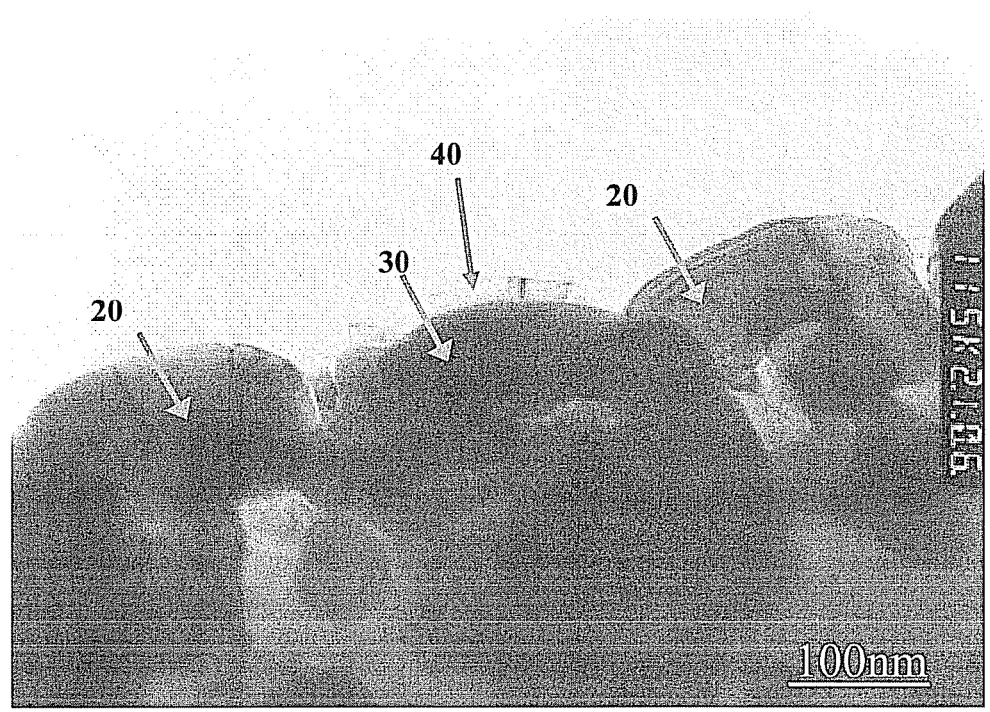
FIG. 3 shows a transmission electron micrograph (TEM) of embodiments of metal carbide structures and a metallic structure on a diamond grain (not shown).

With reference to FIG. 3, the nickel structures of the embodiment shown in FIG. 2 have a film or "halo" of amorphous carbon covering a surface of the nickel formations. This may be as a result of nickel enhanced carbo-thermal reduction of the tantalum oxide, $Ta_2O_5$, precursor on the diamond surface to form TaC.

Carbon from the body may play a role in a process of carbo-thermal reduction of the precursor materials, in which process the precursor materials are reduced and metal carbide compounds are formed.

EXAMPLES

Embodiments of the invention are described in more detail with reference to the examples below, which are not intended to limit the invention.

Example 1

A plurality of diamond grains in the form of a powder, the grains having average size distribution of about 2 micron were coated with a partial coating comprising tantalum carbide and a partial coating comprising nickel. The partial coatings were deposited using the following steps:
Coating with Precursor for Metal Carbide
i. 100 g of diamond powder comprising diamond grains having average size of about 2 microns was suspended in 2 liter of AR grade ethanol, $C_2H_5OH$. A solution of tantalum ethoxide, $Ta(OC_2H_5)_5$ in dry ethanol and separate aliquot of water and ethanol was slowly and simultaneously added to this suspension while vigorously stirring. The tantalum ethoxide solution comprised 147 g of ethoxide dissolved in 100 ml of anhydrous ethanol. The aliquot of water and ethanol was made by combining 65 ml of de-ionised water with 150 ml AR ethanol. In the stirred diamond/ethanol suspension, the tantalum ethoxide reacted with the water and formed a coat of amorphous, micro-porous tantalum oxide, $Ta_2O_5$ on the diamond particles.
ii. The coated diamond was recovered from the alcohol after a few repeated cycles of settling, decantation and washing with pure ethanol. The powder was then made substantially alcohol free by heating at 90° C. under vacuum.

This coated diamond powder was then re-suspended in 2.5 liters of de-ionised water. To this suspension an aqueous solution of nickel nitrate, $Ni(NO_3)_2$ and an aqueous solution of sodium carbonate, $Na_2CO_3$ were slowly simultaneously added while the suspension was vigorously stirred. The nickel nitrate aqueous solution was made by dissolving 38.4 g of $Ni(NO_3)_2.6H_2O$ crystals in 200 ml of de-ionised water. The sodium carbonate aqueous solution was made by dissolving 14.7 g of $Na_2CO_3$ crystals in 200 ml of de-ionised water. The nickel nitrate and slightly excess sodium carbonate reacted in the suspension and precipitated nickel carbonate, $NiCO_3$ crystals.

Coating with Precursor for Metallic Nickel
iii. The sodium nitrate product of the precipitative reaction, together with any unreacted sodium carbonate was then removed by a few repeated cycles of decantation and washing in de-ionised water. After a final wash in pure alcohol the coated, decorated diamond powder was dried under vacuum at 90° C.

Heat Treatment to Convert Precursors Respectively to TaC and Ni

The dried powder was then placed in an alumina boat with a loose powder depth of about 5 mm, and heated in a flowing stream of 10% hydrogen gas in pure argon. The top temperature of 1100° C. was maintained for 3 hours and then the furnace cooled to room temperature.

Energy Dispersive X-ray Spectra analysis, EDS revealed that the relative elemental amounts metals present. From this analysis, it was established that the ratio of the metal carbide volume to the metal volume was about 59:41.

Example 2

A plurality of diamond grains in the form of a powder, the grains having average size distribution of about 2 micron were coated with a partial coating comprising titanium carbide and a partial coating comprising nickel. The partial coatings were deposited using the following steps:
Coating with Precursor for Metal Carbide
i. 60 g of 2 micron diamond powder was suspended in 750 ml of AR grade ethanol, $C_2H_5OH$. To this suspension, while maintaining vigorous stirring, a solution of titanium iso-propoxide, $Ti(OC_3H_7)_4$ in dry ethanol and separate aliquot of water and ethanol was slowly and simultaneously added. The titanium iso-propoxide solution was made from 71 g of the alkoxide dissolved in 50 ml of anhydrous ethanol. The aliquot of water and ethanol was made by combining 45 ml of de-ionosed water with 75 ml AR ethanol. In the stirred diamond/ethanol suspension, the titanium iso-propoxide reacted with the water and formed a coat of amorphous, micro-porous titanium oxide, $TiO_2$, on each and every particle of diamond.
ii. The coated diamond was recovered from the alcohol after a few repeated cycles of settling, decantation and washing with pure ethanol.
Coating with Precursor for Metallic Nickel
iii. The powder was then made alcohol free by heating at 90° C. under vacuum. This coated diamond powder was then re-suspended in 1500 ml of de-ionised water. To this suspension an aqueous solution of nickel nitrate, $Ni(NO_3)_2$ and an aqueous solution of sodium carbonate, $Na_2CO_3$ were slowly simultaneously added while the suspension was vigorously stirred. The nickel nitrate aqueous solution was made by dissolving 16 g of $Ni(NO_3)_2.6H_2O$ crystals in 250 ml of de-ionised water. The sodium carbonate aqueous solution was made by dissolving 6.2 g of $Na_2CO_3$ crystals in 250 ml of de-ionised water. The nickel nitrate and slightly excess sodium carbonate reacted in the suspension and precipitated nickel carbonate, $NiCO_3$ crystals. The nickel carbonate crystals formed exclusively on and in the high surface area, micro-porous $TiO_2$ coat already attached to the diamond surfaces.

iv. The sodium nitrate product of the precipitative reaction, together with any unreacted sodium carbonate was then removed by a few repeated cycles of decantation and washing in de-ionised water. After a final wash in pure alcohol the coated, decorated diamond powder was dried under vacuum at 90° C.

Heat Treatment to Convert Precursors

The dried powder was then placed in an alumina boat with a loose powder depth of about 5 mm, and heated in a flowing stream of 10% hydrogen gas in pure argon. The top temperature of 1200° C. was maintained for 3 hours and then the furnace cooled to room temperature.

The resultant powder was characterized using high resolution Scanning Electron Microscopy, SEM, Energy Dispersive X-ray Spectra, EDS and X-ray Diffraction, XRD. The analysis showed that each diamond particle was coated with TlC and Ni extremely fine grain size. From this analysis the ratio of the volume of carbide ceramic material to the volume of metallic material was 75:25.

Example 3

A plurality of diamond grains in the form of a powder, the grains having average size distribution of about 2 micron were coated with a partial coating comprising titanium carbide and a partial coating comprising cobalt. The partial coatings were deposited using the following steps:

The same process was used as in example 2, save only that cobalt nitrate crystals, $Co(NO_3)_2.6H_2O$ were used instead of nickel nitrate. Cobalt thus replaced nickel in the enhanced carbo-thermal reduction of the $TiO_2$ on the diamond surfaces. Cobalt carbonate, $CoCO_3$ was the precursor for the Co, precipitated.

The weight ratio of the metal carbide to the cobalt metal was about 62:38, corresponding to a volume ratio of about 73:27.

Example 4

A plurality of diamond grains in the form of a powder, the grains having average size distribution of about 2 micron were coated with a partial coating comprising titanium tungsten carbide, (TiW)C, and a partial coating comprising nickel. The atomic proportions of titanium to tungsten are about 3 to 1. Nickel was absent from this material. The partial coatings were deposited using the following steps:

Coating with Precursor for Metal Carbide i. 60 g of 2 micron diamond powder was suspended in 750 ml of AR grade ethanol, $C_2H_5OH$. To this suspension, while maintaining vigorous stirring, a solution of titanium iso-propoxide, $Ti(OC_3H_7)_4$ in dry ethanol and separate aliquot of water and ethanol was slowly and simultaneously added. The titanium iso-propoxide solution was made from 70.4 g of the alkoxide dissolved in 70 ml of anhydrous ethanol. The aliquot of water and ethanol was made by combining 45 ml of de-ionosed water with 100 ml AR ethanol. In the stirred diamond/ethanol suspension, the titanium iso-propoxide reacted with the water and formed a coat of amorphous, micro-porous titanium oxide, $TiO_2$, on each and every particle of diamond.

ii. The coated diamond was recovered from the alcohol after a few repeated cycles of settling, decantation and washing with pure ethanol.

Coating with Precursor for Metal iii. The $TiO_2$ coated diamond was then re-dispersed in 750 ml of de-ionised water. To this suspension a solution of ammonium paratungstate in water, made by dissolving 34.8 g of ammonium paratungstate, $(NH_4)_{10}W_{12}O_{41}.5H_2O$, in 750 ml of de-ionised was added. While continuously being stirred, 150 ml of a 55 vol % nitric acid, $HNO_3$, in water was subsequently added to the suspension. Tungstic oxide, $WO_3$, was precipitated and formed on and in the micro-porous $TiO_2$ coat on the diamond.

iv. Cycles of settling, decantation and washing with water were carried out until a neutral pH was obtained.

v. The diamond powder now co-coated in $TiO_2$ & $WO_3$ was then re-suspended in 750 ml of de-ionised water. While stirring, separate solutions of cobalt nitrate and sodium carbonate in water were slowly and simultaneously added. The cobalt nitrate solution was made from 27.5 g of $Co(NO_3).6H_2O$ crystals dissolved in 150 ml de-ionised water and the sodium carbonate solution from 10 g of $Na_2CO_3$ in 150 ml de-ionised water. A precipitate of cobalt carbonate, $CoCO_3$ formed in and on the existing $TiO_2/WO_3$ coat of the suspended diamond.

vi. The sodium nitrate product of the precipitative reaction, together with any unreacted sodium carbonate was then removed by a few repeated cycles of decantation and washing in de-ionised water. After a final wash in pure alcohol the coated, decorated diamond powder was dried under vacuum at 90° C.

In this way the diamond particles were coated with an extremely intimate combination of $TiO_2$, $WO_3$ and $CoCO_3$ precursor materials.

Heat Treatment to Convert Precursors

The dried powder was then placed in an alumina boat with a loose powder depth of about 5 mm, and heated in a flowing stream of 10% hydrogen gas in pure argon. The top temperature of 1200° C. was maintained for 3 hours and then the furnace cooled to room temperature. During this heat treatment the precursor materials coating the diamond were reduced by hydrogen and or carbon to form combined titanium, tungsten carbide and cobalt metal.

The resulting powder was characterized using high resolution Scanning Electron Microscopy, SEM, Energy Dispersive X-ray Spectra, EDS and X-ray Diffraction, XRD. The analysis showed that each and every diamond particle was now coated with TiWC/Co cermet material of extremely fine grain size.

The weight ratio of the ceramic to the metallic components was about 72:28, corresponding to a volume ratio of about 74:26.

The invention claimed is:

1. A body comprising diamond as individual grains or as a bonded mass of individual grains, wherein each of said grains comprises a micro-porous layer directly adhered to the grains where the micro-porous layer comprises a refractory precursor material comprising an oxide of at least one metal selected from the group consisting of Ti, V, Cr, Zr, Nb, Mo, Hf, Ta, and W;

the refractory precursor material being reducible in the presence of carbon on the application of heat to form at least one compound comprising metal carbide or mixed metal carbide; and a solvent/catalyst precursor material contained on a surface of and inside pores of the micro-porous layer, said solvent/catalyst comprising a compound including oxygen and at least one metal selected from the group consisting of Fe, Co, Ni and Mn, the solvent/catalyst material being capable of reducing in the presence of carbon on the application of heat to form a metallic material.

2. A body as claimed in claim 1, wherein the refractory precursor material is in the form of microstructures.

3. A body as claimed in claim 2, wherein the microstructures have a mean size of at least 0.01 microns and at most 10 microns.

4. A body as claimed in claim 2, wherein the microstructures comprise titanium carbide.

5. A body as claimed in claim 1, wherein the body comprises at least 5 volume percent refractory material.

6. A body as claimed in claim 1, wherein the body comprises less than 10 volume percent metallic material.

7. A body as claimed in claim 1, the metallic material comprising nickel.

\* \* \* \* \*